US011361339B2

(12) United States Patent
Tam et al.

(10) Patent No.: US 11,361,339 B2
(45) Date of Patent: *Jun. 14, 2022

(54) SYSTEM, METHOD, AND COMPUTER PROGRAM FOR PROVIDING NOTIFICATION OF A CASHBACK REWARD FROM A SHOPPING PORTAL USING ONLINE SCREEN AND EMAIL ANALYSIS (71) Applicant: Ebates Performance Marketing, Inc., San Mateo, CA (US)

(72) Inventors: Cynthia May-Yee Tam, San Francisco, CA (US); Makarand Suresh Kharche, Fremont, CA (US)

(73) Assignee: Rakuten Group, Inc., Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 16/919,509

(22) Filed: Jul. 2, 2020

(65) Prior Publication Data
US 2020/0334704 A1    Oct. 22, 2020

Related U.S. Application Data (63) Continuation of application No. 15/799,309, filed on Oct. 31, 2017, now Pat. No. 10,740,781.

(51) Int. Cl.
*G06Q 30/02* (2012.01)
*G06Q 30/06* (2012.01)

(52) U.S. Cl.
CPC ..... *G06Q 30/0234* (2013.01); *G06Q 30/0207* (2013.01); *G06Q 30/0222* (2013.01); *G06Q 30/0633* (2013.01)

(58) Field of Classification Search
CPC ............. G06Q 30/0207–0277; G06Q 30/0633
See application file for complete search history.

(56) References Cited

U.S. PATENT DOCUMENTS

| 4,910,672 | A | 3/1990 | Off et al. |
| 5,250,789 | A | 10/1993 | Johnsen |
| 5,500,890 | A | 3/1996 | Rogge et al. |
| 6,029,141 | A | 2/2000 | Bezos et al. |

(Continued)

FOREIGN PATENT DOCUMENTS

| CN | 101194282 | 6/2008 |
| JP | 10-240823 | 9/1998 |
| JP | 11-134408 | 5/1999 |
| JP | 2000-163480 | 6/2000 |

(Continued)

OTHER PUBLICATIONS

International Search Report and Written Opinion in PCT Application No. PCT/US2017/059314 dated Feb. 1, 2018.

(Continued)

*Primary Examiner* — Kiersten V Summers
(74) *Attorney, Agent, or Firm* — Lessani Law Group, PC (57) ABSTRACT The present disclosure relates to a system, method, and computer program for providing users with notifications of a cashback rewards from a shopping portal using screen and email analysis. A shopping portal system analyzes the content and characteristics of user emails, as well as screens viewed by the user through a client application (e.g., webpages and mobile application screens), to identify probable order-confirmation emails and screens. In response to identifying an order-confirmation email or an order-confirmation screen, the system determines whether a cashback reward should be credited to the user for the order corresponding to the order-confirmation email/screen. In response to an order-confirmation email or screen satisfying the criteria for a cashback reward, the system credits a user account with the cashback reward and notifies the user of the reward.

21 Claims, 9 Drawing Sheets

(56) References Cited

U.S. PATENT DOCUMENTS

| | | | |
|---|---|---|---|
| 6,101,482 A | 8/2000 | DiAngelo et al. | |
| 6,128,600 A | 10/2000 | Imamura et al. | |
| 6,341,353 B1 | 1/2002 | Herman et al. | |
| 6,460,036 B1 | 10/2002 | Herz et al. | |
| 6,571,279 B1 | 5/2003 | Herz et al. | |
| 6,611,814 B1 | 8/2003 | Lee et al. | |
| 6,725,222 B1 | 4/2004 | Musgrove et al. | |
| 7,162,443 B2 | 1/2007 | Shah | |
| 7,305,355 B2 | 12/2007 | Tarvydas et al. | |
| 7,328,176 B2 | 2/2008 | Tarvydas et al. | |
| 7,512,548 B1 | 3/2009 | Bezos et al. | |
| 7,734,729 B2 | 6/2010 | Du et al. | |
| 7,752,535 B2 | 7/2010 | Satyavolu | |
| 7,925,546 B2 | 4/2011 | Jacobi et al. | |
| 8,036,934 B2 | 10/2011 | Mankoff | |
| 8,359,309 B1 | 1/2013 | Provine et al. | |
| 8,392,288 B1 | 3/2013 | Miller | |
| 8,489,456 B2 | 7/2013 | Burgess et al. | |
| 8,510,166 B2 | 8/2013 | Neven | |
| 8,527,436 B2 * | 9/2013 | Salaka | G06Q 10/107 706/45 |
| 8,661,029 B1 | 2/2014 | Kim et al. | |
| 8,676,665 B2 | 3/2014 | Tarvydas et al. | |
| 8,694,511 B1 | 4/2014 | Corduneanu et al. | |
| 8,812,532 B2 | 8/2014 | Skaf | |
| 8,844,010 B2 | 9/2014 | Brady et al. | |
| 9,159,079 B2 | 10/2015 | Lambert et al. | |
| 9,201,672 B1 | 12/2015 | Arana et al. | |
| 9,384,504 B2 | 7/2016 | Lampert | |
| 9,779,441 B1 | 10/2017 | Jadhav et al. | |
| 9,922,327 B2 | 3/2018 | Johnson et al. | |
| 10,540,698 B2 * | 1/2020 | Pratt | H04L 47/80 |
| 10,740,781 B2 | 8/2020 | Tam et al. | |
| 2001/0032128 A1 | 10/2001 | Kepecs | |
| 2001/0049628 A1 * | 12/2001 | Icho | G06Q 30/0601 705/26.1 |
| 2002/0038255 A1 | 3/2002 | Tarvydas et al. | |
| 2002/0046109 A1 | 4/2002 | Leonard et al. | |
| 2002/0095335 A1 | 7/2002 | Barnett et al. | |
| 2002/0117544 A1 | 8/2002 | Wolf et al. | |
| 2002/0124255 A1 | 9/2002 | Reichardt et al. | |
| 2002/0143660 A1 | 10/2002 | Himmel et al. | |
| 2003/0158844 A1 | 8/2003 | Kramer et al. | |
| 2004/0083134 A1 | 4/2004 | Spero et al. | |
| 2004/0122736 A1 * | 6/2004 | Strock | G06Q 30/0207 705/14.31 |
| 2004/0254855 A1 | 12/2004 | Shah | |
| 2005/0131768 A1 | 6/2005 | Rodriguez et al. | |
| 2005/0267809 A1 | 12/2005 | Zheng | |
| 2006/0122899 A1 | 6/2006 | Lee et al. | |
| 2006/0242011 A1 | 10/2006 | Bell et al. | |
| 2006/0259364 A1 | 11/2006 | Strock et al. | |
| 2006/0265281 A1 | 11/2006 | Sprovieri et al. | |
| 2007/0050258 A1 | 3/2007 | Dohse | |
| 2007/0203784 A1 * | 8/2007 | Keller | G06Q 30/0256 705/14.1 |
| 2007/0271147 A1 | 11/2007 | Crespo et al. | |
| 2008/0005090 A1 | 1/2008 | Khan et al. | |
| 2008/0033939 A1 | 2/2008 | Khandelwal | |
| 2008/0103887 A1 | 5/2008 | Oldham et al. | |
| 2008/0109327 A1 | 5/2008 | Mayle et al. | |
| 2008/0120129 A1 | 5/2008 | Seubert et al. | |
| 2008/0154731 A1 | 6/2008 | Mesaros | |
| 2008/0155547 A1 | 6/2008 | Weber et al. | |
| 2008/0208606 A1 | 8/2008 | Allsop et al. | |
| 2008/0319854 A1 | 12/2008 | Duroux et al. | |
| 2009/0024464 A1 | 1/2009 | Weiss et al. | |
| 2009/0083164 A1 | 3/2009 | Hull et al. | |
| 2009/0099920 A1 | 4/2009 | Aharoni et al. | |
| 2009/0234737 A1 | 9/2009 | Sarelson et al. | |
| 2009/0240588 A1 | 9/2009 | Turner et al. | |
| 2010/0042515 A1 | 2/2010 | Crespo et al. | |
| 2010/0049538 A1 | 2/2010 | Frazer et al. | |
| 2010/0161399 A1 | 6/2010 | Posner et al. | |
| 2010/0174623 A1 | 7/2010 | McPhie et al. | |
| 2010/0205068 A1 | 8/2010 | Hodson et al. | |
| 2011/0022448 A1 | 1/2011 | Strock et al. | |
| 2011/0035379 A1 | 2/2011 | Chen et al. | |
| 2011/0060998 A1 | 3/2011 | Schwartz et al. | |
| 2011/0106605 A1 | 5/2011 | Malik et al. | |
| 2011/0167456 A1 | 7/2011 | Kokenos et al. | |
| 2011/0173097 A1 | 7/2011 | McKee | |
| 2011/0191181 A1 | 8/2011 | Blackhurst et al. | |
| 2011/0191310 A1 | 8/2011 | Liao et al. | |
| 2012/0078731 A1 | 3/2012 | Linevsky et al. | |
| 2012/0158705 A1 | 6/2012 | Konig et al. | |
| 2012/0166268 A1 | 6/2012 | Griffiths | |
| 2012/0197700 A1 | 8/2012 | Kalin | |
| 2012/0197753 A1 | 8/2012 | Kalin | |
| 2012/0203632 A1 | 8/2012 | Blum et al. | |
| 2012/0271691 A1 | 10/2012 | Hammad et al. | |
| 2012/0284108 A1 * | 11/2012 | Fontana | G06Q 50/01 705/14.27 |
| 2012/0311509 A1 | 12/2012 | Maggiotto et al. | |
| 2013/0006803 A1 | 1/2013 | Oskolkov et al. | |
| 2013/0024282 A1 * | 1/2013 | Kansal | G06Q 30/01 707/755 |
| 2013/0030853 A1 | 1/2013 | Agarwal et al. | |
| 2013/0046621 A1 | 2/2013 | Asseoff et al. | |
| 2013/0073356 A1 | 3/2013 | Cooper et al. | |
| 2013/0144706 A1 | 6/2013 | Qawami et al. | |
| 2013/0173364 A1 | 7/2013 | Choong et al. | |
| 2013/0179303 A1 | 7/2013 | Petrou et al. | |
| 2013/0185125 A1 | 7/2013 | Celorio-Martinez et al. | |
| 2013/0204748 A1 | 8/2013 | Sugiura | |
| 2013/0246199 A1 | 9/2013 | Carlson | |
| 2013/0304563 A1 | 11/2013 | Haupt et al. | |
| 2013/0346221 A1 | 12/2013 | Rangachari et al. | |
| 2014/0006165 A1 | 1/2014 | Grigg et al. | |
| 2014/0100929 A1 | 4/2014 | Burgess et al. | |
| 2014/0122203 A1 | 5/2014 | Johnson et al. | |
| 2014/0129308 A1 | 5/2014 | Rappoport | |
| 2014/0172536 A1 | 6/2014 | Korzenko et al. | |
| 2014/0200997 A1 | 7/2014 | Anderson et al. | |
| 2014/0207551 A1 * | 7/2014 | Van Der Spoel | G06Q 30/00 705/14.23 |
| 2014/0214508 A1 | 7/2014 | Lee et al. | |
| 2014/0279214 A1 | 9/2014 | Wagoner-Edwards et al. | |
| 2014/0372193 A1 | 12/2014 | Jorgensen et al. | |
| 2015/0032522 A1 * | 1/2015 | Dintenfass | G06Q 30/0226 705/14.27 |
| 2015/0032538 A1 * | 1/2015 | Calman | G06Q 30/0255 705/14.53 |
| 2015/0032602 A1 * | 1/2015 | Blackhurst | G06Q 40/02 705/39 |
| 2015/0039481 A1 | 2/2015 | Els et al. | |
| 2015/0088607 A1 | 3/2015 | Georgoff et al. | |
| 2015/0112774 A1 | 4/2015 | Georgoff et al. | |
| 2015/0112836 A1 | 4/2015 | Godsey et al. | |
| 2015/0178820 A1 | 6/2015 | Green et al. | |
| 2015/0220979 A1 | 8/2015 | Ouimet et al. | |
| 2015/0302424 A1 | 10/2015 | Akbarpour et al. | |
| 2015/0310468 A1 | 10/2015 | Mesaros | |
| 2015/0347595 A1 | 12/2015 | Norman et al. | |
| 2015/0348140 A1 | 12/2015 | Campbell | |
| 2016/0110762 A1 | 4/2016 | Mastierov et al. | |
| 2016/0140610 A1 | 5/2016 | McDonough | |
| 2017/0039583 A1 | 2/2017 | Aissa | |
| 2018/0089692 A1 | 3/2018 | Johnson et al. | |
| 2018/0108054 A1 | 4/2018 | Doubinski et al. | |
| 2018/0315067 A1 | 11/2018 | Shi et al. | |
| 2019/0130433 A1 | 5/2019 | Tam et al. | |

FOREIGN PATENT DOCUMENTS

| | | |
|---|---|---|
| JP | 2001-109742 | 4/2001 |
| JP | 2002-063431 | 2/2002 |
| JP | 2002-245366 | 8/2002 |
| JP | 2002-259792 | 9/2002 |
| JP | 2002-312608 | 10/2002 |
| JP | 2008-040753 | 2/2008 |
| JP | 2012-093953 | 5/2012 |
| JP | 2013-218697 | 10/2013 |

(56) References Cited

FOREIGN PATENT DOCUMENTS

| JP | 2015-082134 | 4/2015 |
|---|---|---|
| KR | 1020010077123 | 8/2001 |
| KR | 1020090008777 | 1/2009 |
| KR | 1020100099843 | 9/2010 |
| KR | 1020110055182 | 5/2011 |
| KR | 1020110120241 | 11/2011 |
| RU | 2428741 | 9/2011 |
| WO | 2012074919 | 6/2012 |
| WO | 2012103462 | 8/2012 |
| WO | 2012165033 | 12/2012 |
| WO | 2014205552 | 12/2014 |
| WO | 2018071673 | 4/2018 |

OTHER PUBLICATIONS

Amazon, "Creating a Wish List", available Feb. 25, 2011, retrieved May 29, 2014, http://www.amazon.com/gp/help/customer/display.html?ie=UTF8&nodeId=501088.

Bajaj, "Shopping for Diwali? Here's how you can crack the best online deals", Oct. 20, 2016, pp. 1-3.

Impulse, "Save your favorite products on an impluse. Buy them when you're ready", retrieved Oct. 23, 2016, pp. 1-2.

Keepa, "Features", retrieved Oct. 23, 2016, p. 1-1.

Nakamura, "Out-of-Browser Function Supported Outside the Web Browser", Oct. 1, 2009, vol. 94, p. 154-155.

Owen et al., "Going Beyond Redemption: Closing the Loop with Card-Linked Offers", Jul. 12, 2012, pp. 1-8.

Shoptagr, "When you discover something you want, save it to Shoptagr", retrieved Oct. 23, 2016, p. 1-1.

Taggr, "Wish List any Store & Price Watch", retrieved Oct. 23, 2016, p. 1-1.

Ziftr Alerts, "You do the shopping. We'll do the searching. It's that simple", retrieved Oct. 23, 2016, pp. 1-2.

Wishlist, "Extension for Wishlist App", retrieved Oct. 23, 2016, p. 1-1.

Wishtack, "Gift Ideas & Wishlist", retrieved Oct. 23, 2016, p. 1-1.

Word Press, "Status Tracking", retrieved Oct. 25, 2016, pp. 1-4.

\* cited by examiner

SYSTEM, METHOD, AND COMPUTER PROGRAM FOR PROVIDING NOTIFICATION OF A CASHBACK REWARD FROM A SHOPPING PORTAL USING ONLINE SCREEN AND EMAIL ANALYSIS

RELATED APPLICATION

This application is a continuation of U.S. patent application Ser. No. 15/799,309 titled "System, Method, and Computer Program for Providing Notification of a Cashback Reward from a Shopping Portal Using Online Screen and Email Analysis," which was filed on Oct. 31, 2017, the contents of which are incorporated by reference as if fully disclosed herein.

BACKGROUND OF THE INVENTION

1. Field of the Invention

This invention relates generally to ecommerce systems, and, more specifically, to a system that provides notifications of cashback rewards based on email and online screen analysis.

2. Description of the Background Art

Certain shopping portals, such as EBATES, provide users with cashback rewards in response to users purchasing products online from partner merchants via the shopping portal. The cashback reward is typically a percentage of a purchase price, wherein the percentage may vary based on the merchant. To earn a cashback reward, a registered user of the shopping portal connects to a partner merchant's site through the shopping portal. The user may connect through a mobile application for the shopping portal, a browser with a browser extension for the shopping portal, or a website for the shopping portal. The partner merchant may use cookies to identify purchasers who linked to their site from the shopping portal. Periodically (e.g., weekly, monthly, quarterly), the partner merchant will send the shopping portal a report with the users who purchased products from the merchant in shopping sessions initiated from the shopping portal. For each purchase, the report includes the corresponding purchase amount.

The cashback shopping portals use the reports from partner merchants to calculate cashback rewards earned by users. Because a merchant report may come up to several weeks or more after a purchase, a challenge for such shopping portals is that there is delay between when users makes purchases and when users see their cashback rewards in their cashback accounts. Typically, the shorter the time between when a user makes the purchase and is notified of the cashback reward, the more incentivized the user is to use the shopping portal. Therefore, there is market demand for a solution that enables the shopping portal to "instantly" calculate and notify a cashback reward when a user makes a purchase.

SUMMARY OF THE DISCLOSURE

The present disclosure relates to a system, method, and computer program for using screen and email analysis to provide users with notifications of cashback rewards earned on qualifying online purchases. The method enables a shopping portal that provides cashback rewards to notify users of earned rewards shortly after users make purchases instead of waiting for periodic merchant reports. To the user, it appears to be an "instant" cashback reward because the reward appears shortly after the purchase.

The system analyzes the content and characteristics of user emails to identify probable order-confirmation emails. The system also analyzes the content and characteristics of screens viewed by the user through a client application (e.g., webpages and mobile application screens), to identify probable order-confirmation screens. Order-confirmation emails and order-confirmation screens are emails and screens, respectively, that acknowledge an online order. Emails and screens identified as probably order-confirmation emails and screens are referred to herein as "email captures" and "screen captures," respectively.

The system parses email captures and screen captures to extract data values, including but not limited to date and time stamp, order number, and purchase amount. The extracted data values are stored in association with a user identifier and a merchant identifier corresponding to the email/screen capture.

For each email capture and screen capture, the system determines if the order corresponding to the capture is an order that qualifies for a cashback reward with the shopping portal. This includes determining if one or more extracted data values (e.g., a promo code) correspond to valid terms of a reward-qualifying order. For example, the system may determine if there is a valid promo code in an email or screen capture (e.g., a promo code associated with the shopping portal). For an email capture, determining whether an order qualifies for a cashback reward also includes ascertaining if the order described in the email was likely placed in an online merchant shopping session initiated from the shopping portal. The system makes this determination by comparing data values extracted from the email capture to online merchant shopping records for the user.

In response to determining that the email/screen capture corresponds to a reward-qualifying order, the server determines if a cashback reward has already been credited to the user for the order based on a previous email/screen capture. For an email capture, the system determines if there is a corresponding screen capture. Likewise, for a screen capture, the system determines if there is a corresponding email capture.

If the system finds a corresponding capture, the system determines if a cashback reward was previously credited for the corresponding capture. If so, there is no further cashback reward for the new capture. If the email/screen capture corresponds to a reward-qualifying order and no previous cashback reward has been credited to the user for the order, the system calculates the cashback reward. The system credits the corresponding user account with a cashback reward, and provides a notification to the user of the reward. Examples of the ways in which a user may receive a notification include: a browser notification, a mobile application push notification, an email, a text, and updated account information on a website for the shopping portal.

DETAILED DESCRIPTION OF THE PREFERRED EMBODIMENTS

Figure 1:
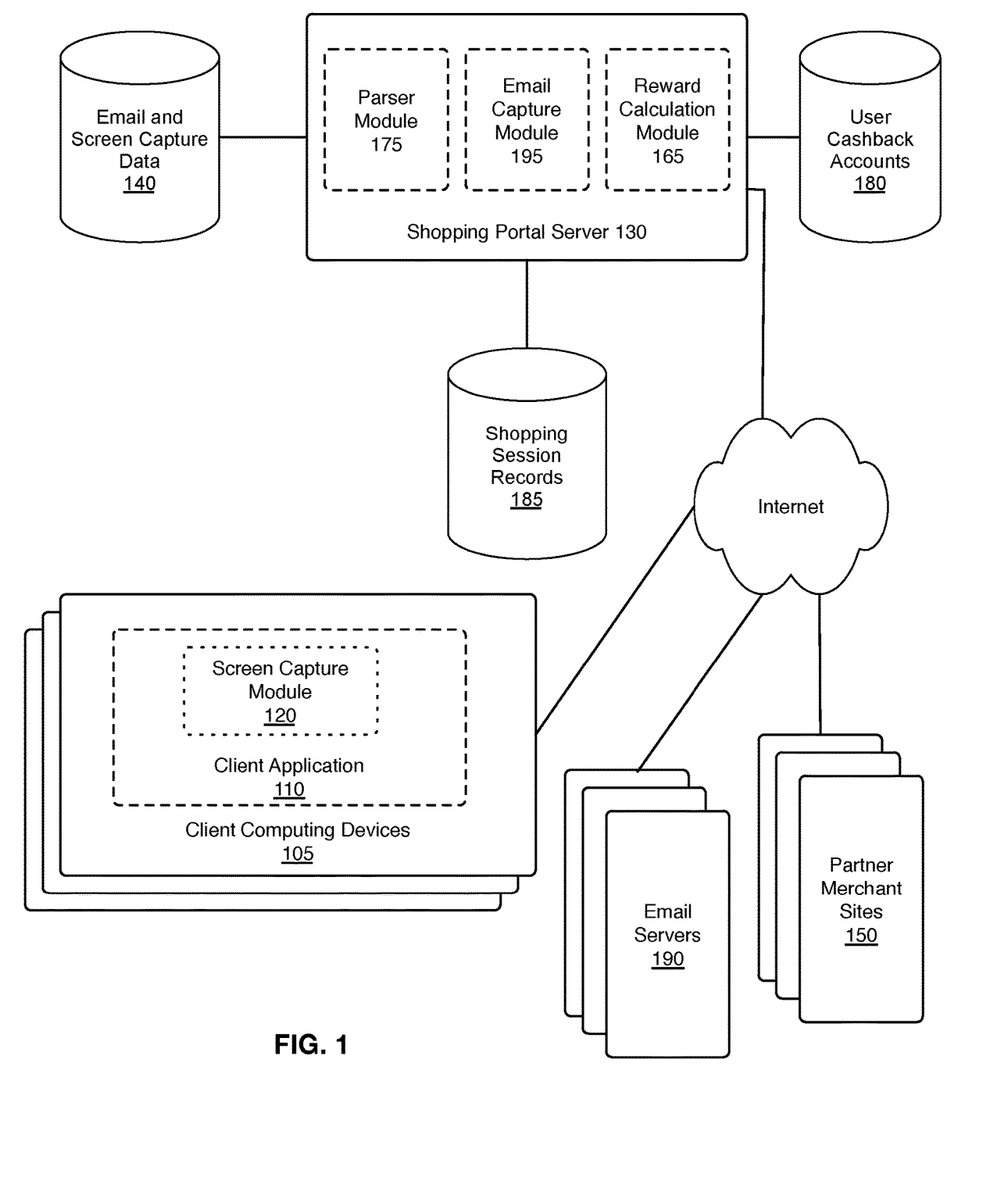
FIG. 1 is a block diagram that illustrates an example system architecture.

The present disclosure relates to a system, method, and computer program for using screen and email analysis to provide users with notifications of cashback rewards earned on online purchases initiated via a shopping portal. FIG. 1 illustrates an example system architecture for implementing the methods described herein. A client application 110 executes on a client computing device 105, such as a smart phone, laptop, tablet, or desktop computer, and enables the user to access online merchant shopping sites 150 via the shopping portal.

The client application 110 may be a general-purpose web browser (e.g., SAFARI, CHROME, FIREFOX, EXPLORER, etc.) with a browser extension that enables a user to access a plurality of different (and unrelated) merchant websites via the shopping portal. For example, when a user navigates to a partner/associated merchant website, a user with the browser extension may click on a button displayed by the browser extension to be redirected to the merchant website via the shopping portal. In redirecting the user, the browser extension adds a cookie to the merchant webpage that indicates that the web visit initiated from the shopping portal. As used herein, the term "browser extension" applies to any software code that executes within the context of a web browser and extends the normal functionality of a browser, including, but not limited to browser extensions and browser add-ons.

The client application 110 may also be a mobile application for the shopping portal, via which a user accesses a plurality of different (and unrelated) merchant shopping sites.

The client application 110 includes a screen capture module 120 that analyzes online screens rendered to the user in the client application 110 in order to identify order-confirmation screens, as described in more detail below. With respect to a web client with a browser extension for the shopping portal, the screen capture module 120 may be part of the browser extension.

The system includes a server 130 associated with the shopping portal. The server 130 receives records from client applications 110 of shopping sessions at merchant sites initiated through the client applications. A record of these shopping sessions is maintained in a database 185. The server 130 also receives screens identified by screen capture modules 120 within users' client applications as being likely order-confirmation screens. Furthermore, the server 130 includes an email capture module 195 that obtains users emails from email servers 190 and analyzes the emails to identify order-confirmation emails from applicable merchants (i.e., merchants for which a cashback reward is eligible). As described below, the server 130 further analyzes the email and screen content and calculates cashback rewards as appropriate. The other modules illustrated in FIG. 1 are discussed below with respect to FIGS. 2-4.

Figure 2A:
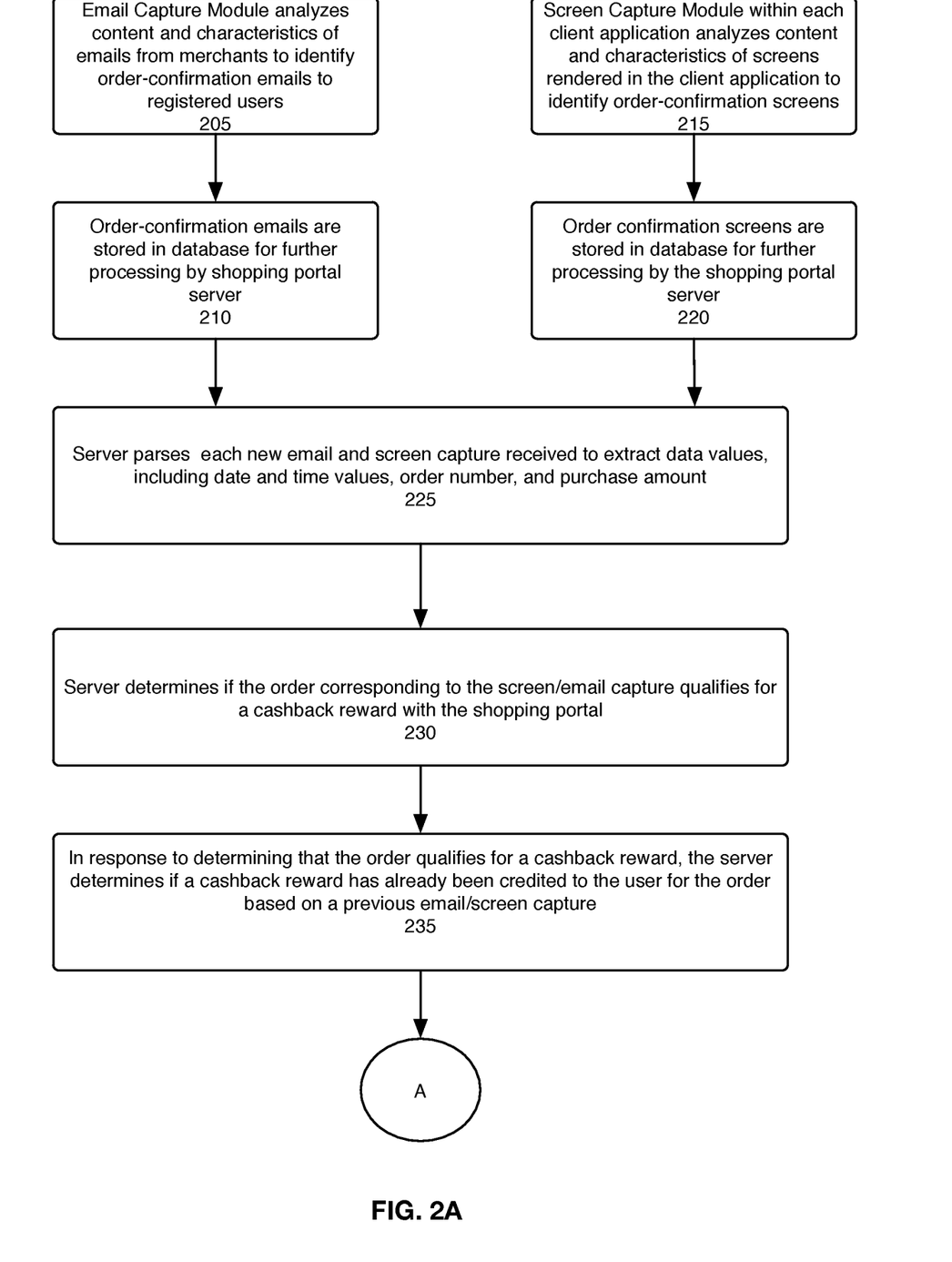
FIGS. 2A-2B are flowcharts that illustrate a method, according to one embodiment, for providing users with notifications of a cashback rewards using screen and email analysis.
Figure 2B:
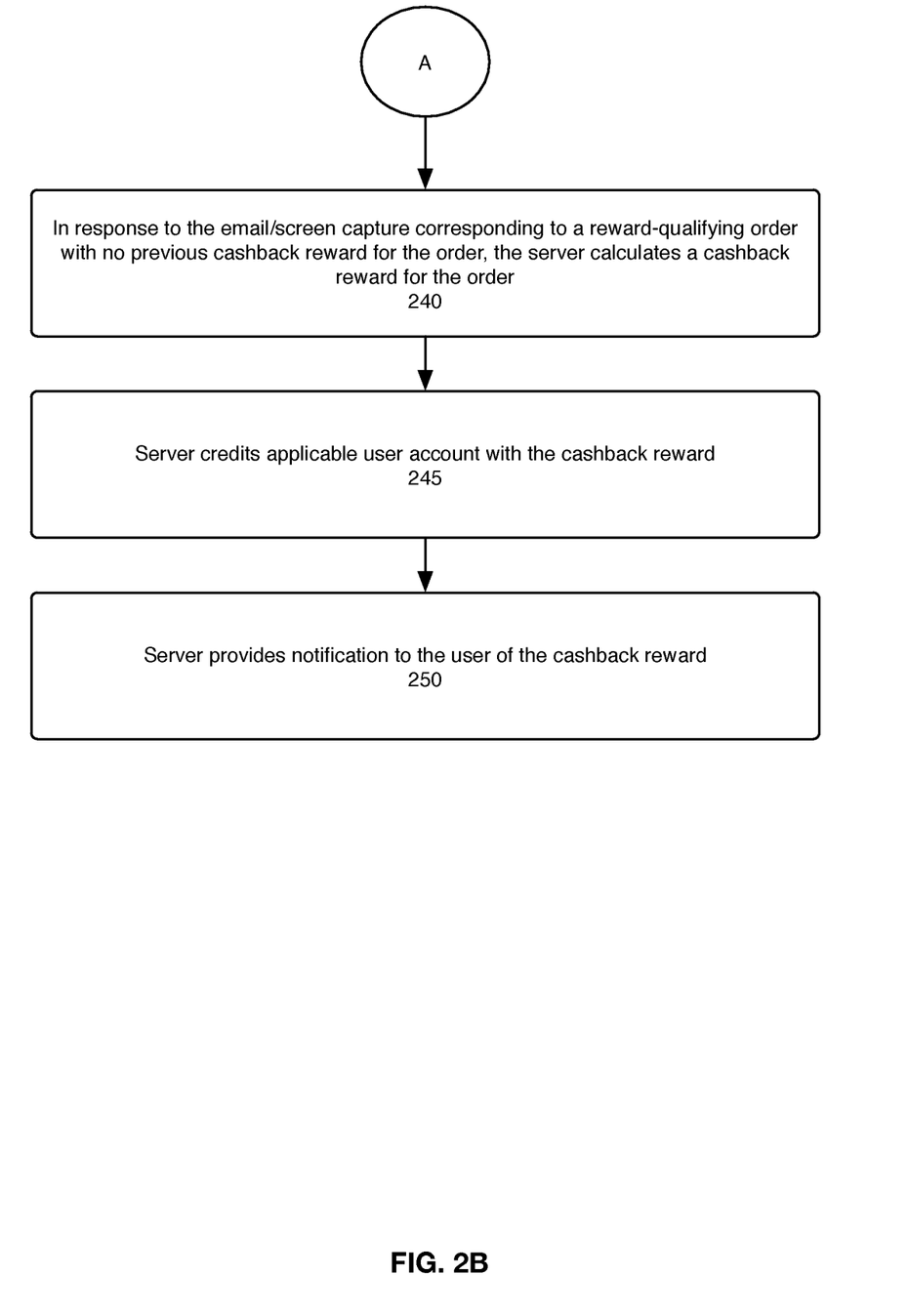
Figure 3A:
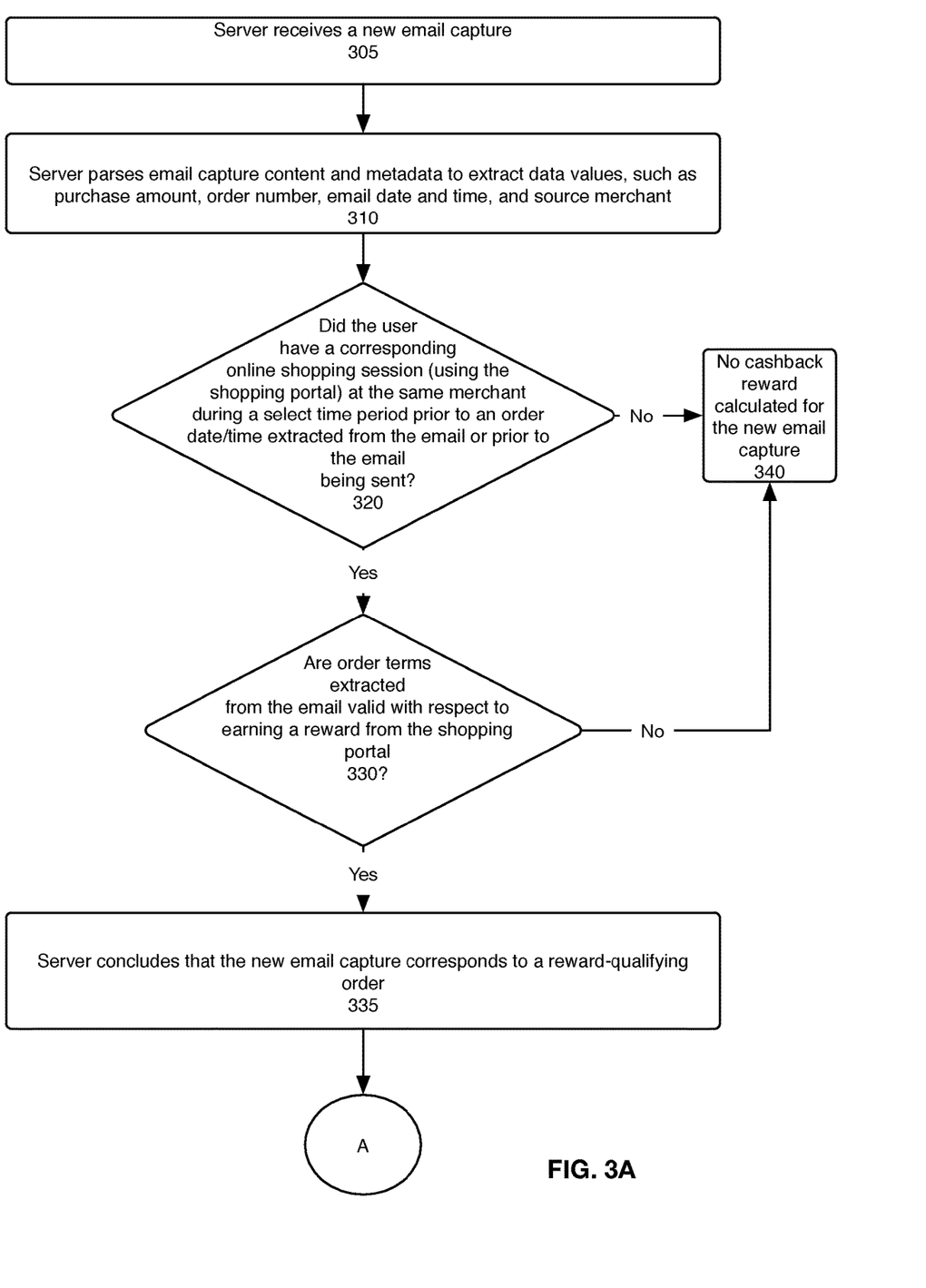
FIGS. 3A-C are flowcharts that illustrate an example implementation of the reward calculation in response to identifying an email as a probable order-confirmation email.
Figure 3B:
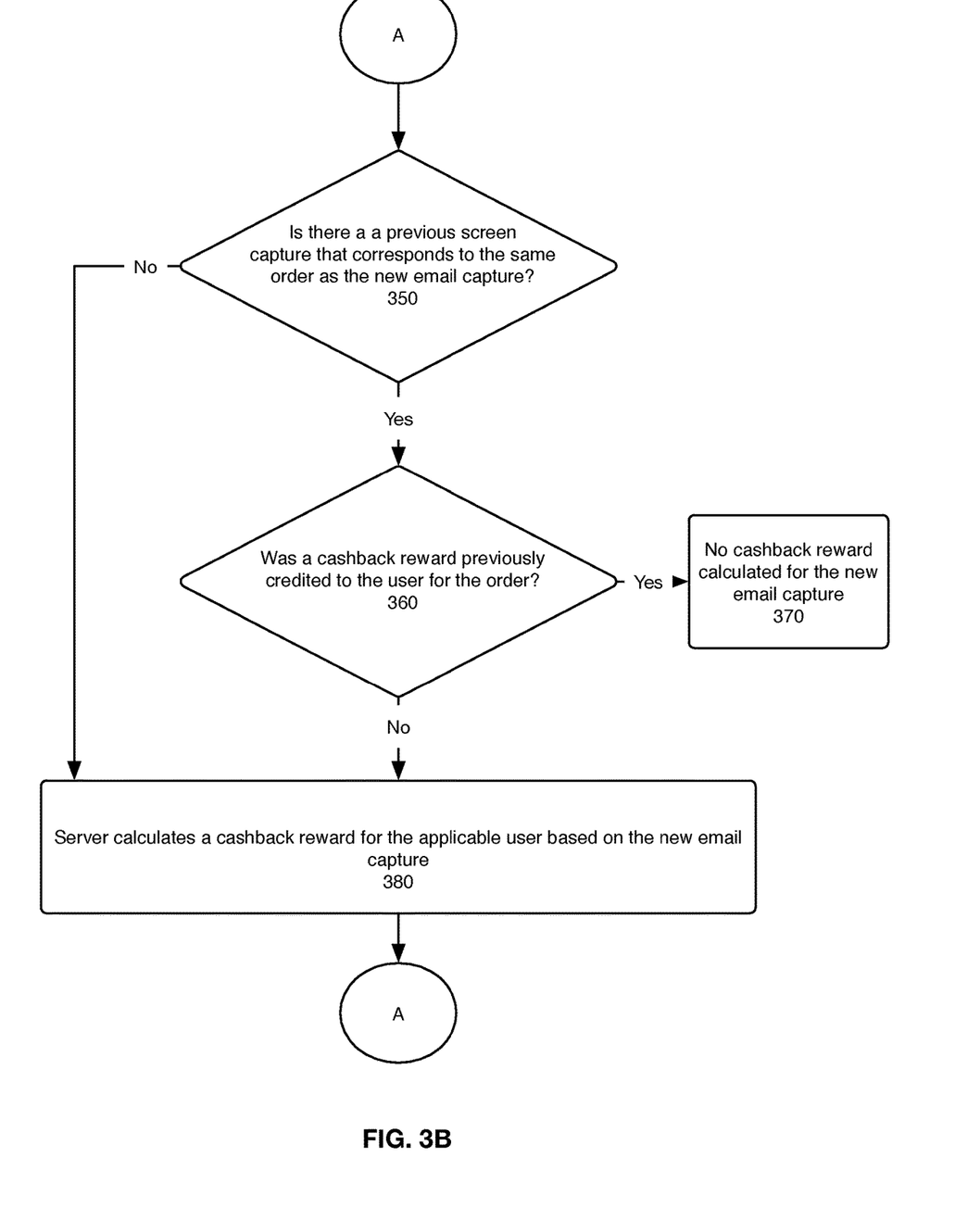
Figure 3C:
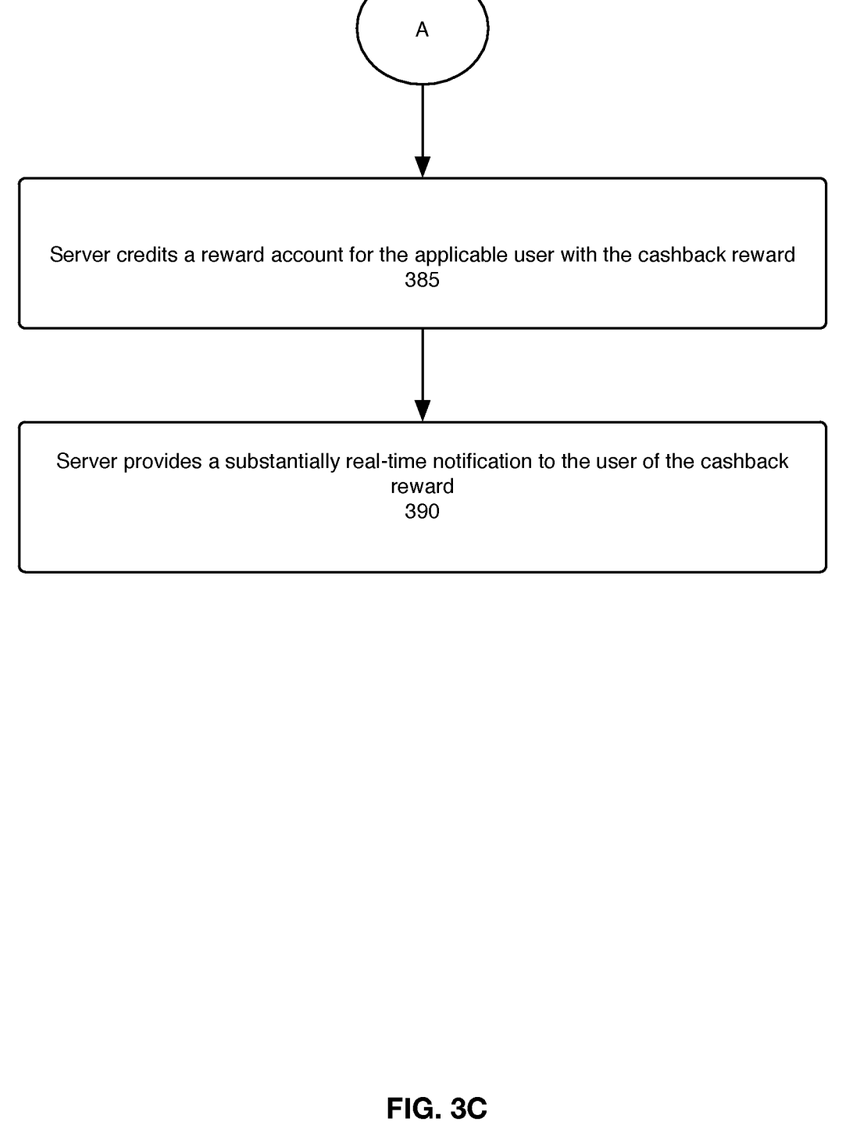
Figure 4A:
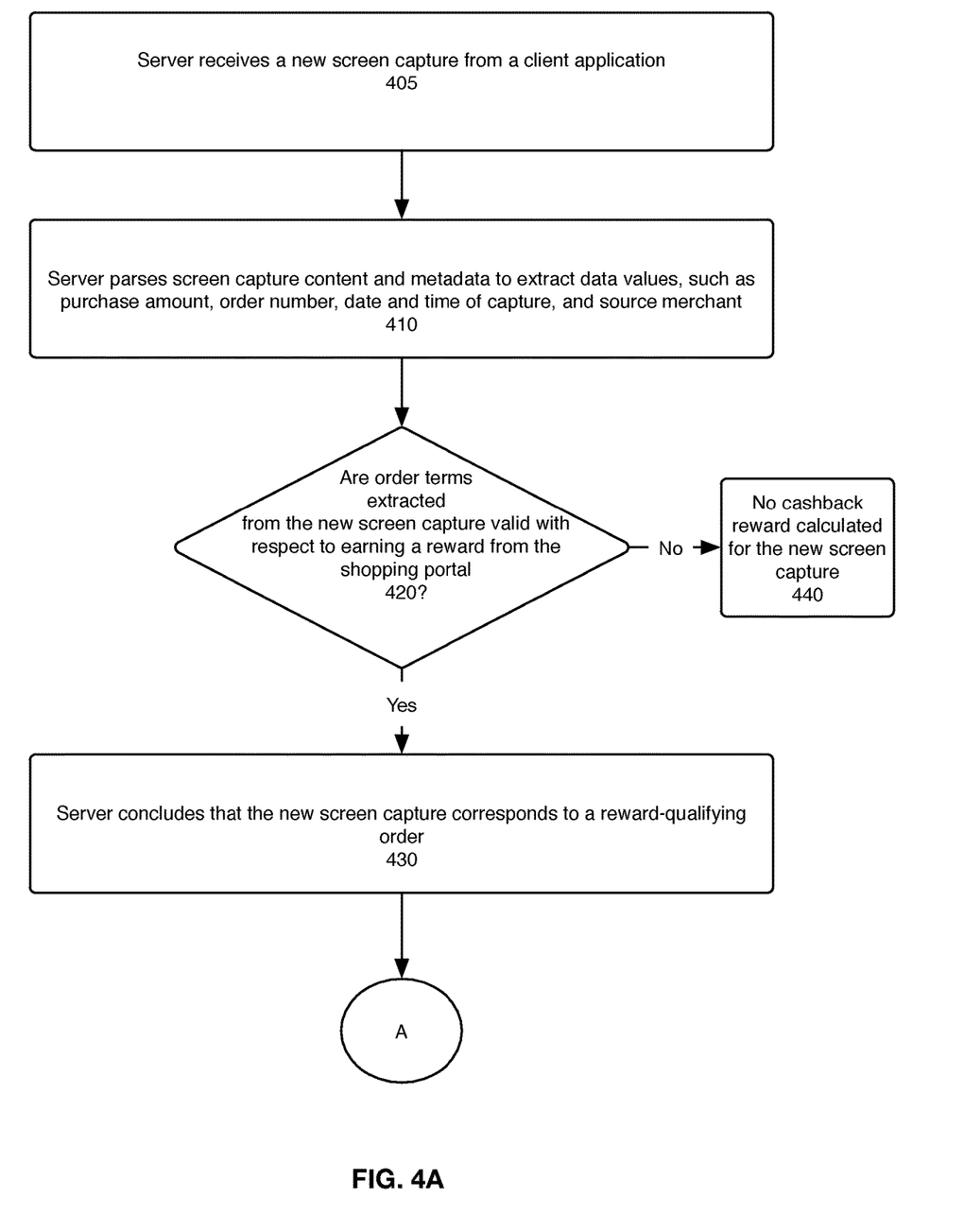
FIGS. 4A-C are flowcharts that illustrate an example implementation of the reward calculation in response to identifying an online screen as a probable order-confirmation screen.
Figure 4B:
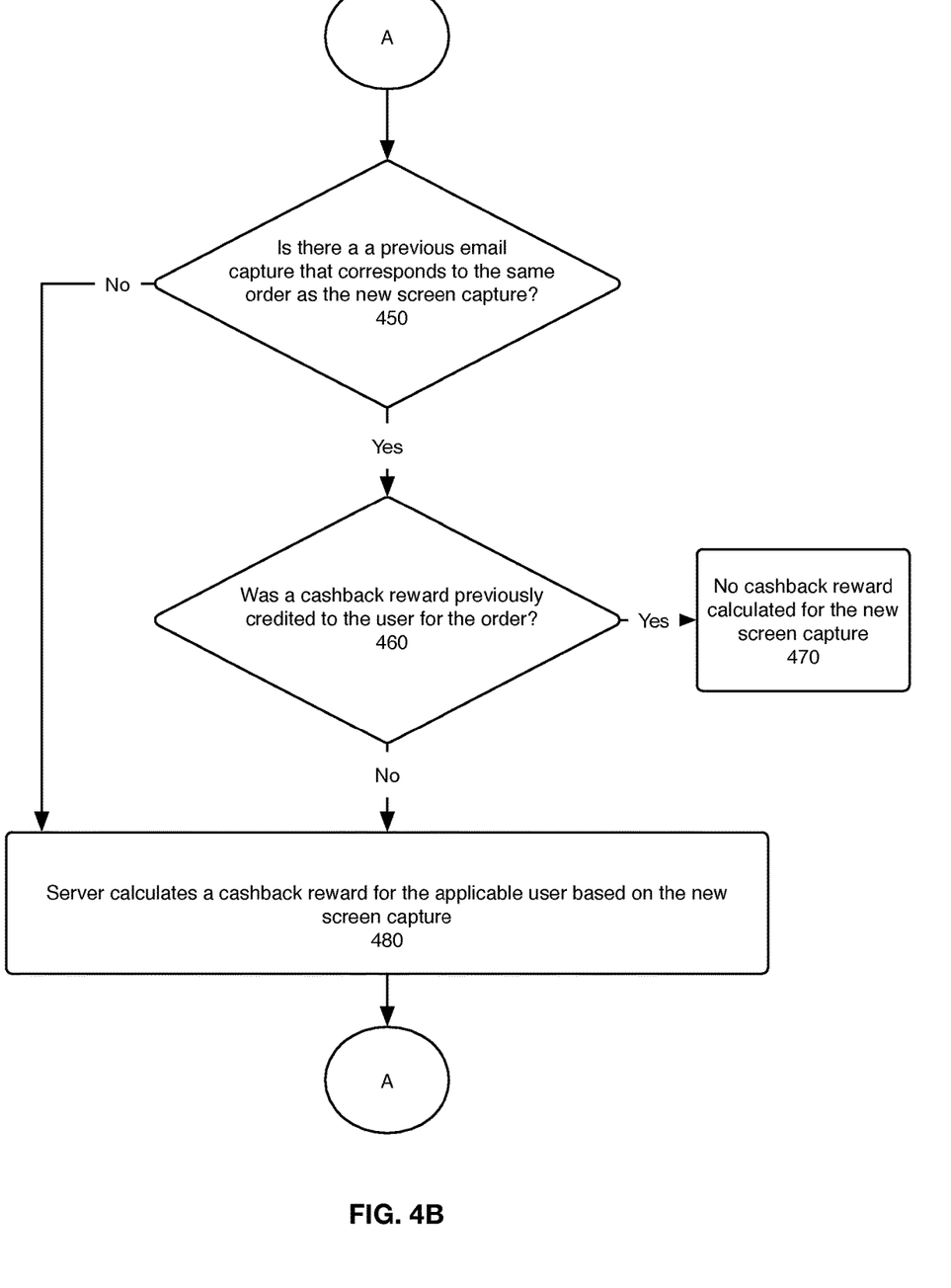
Figure 4C:
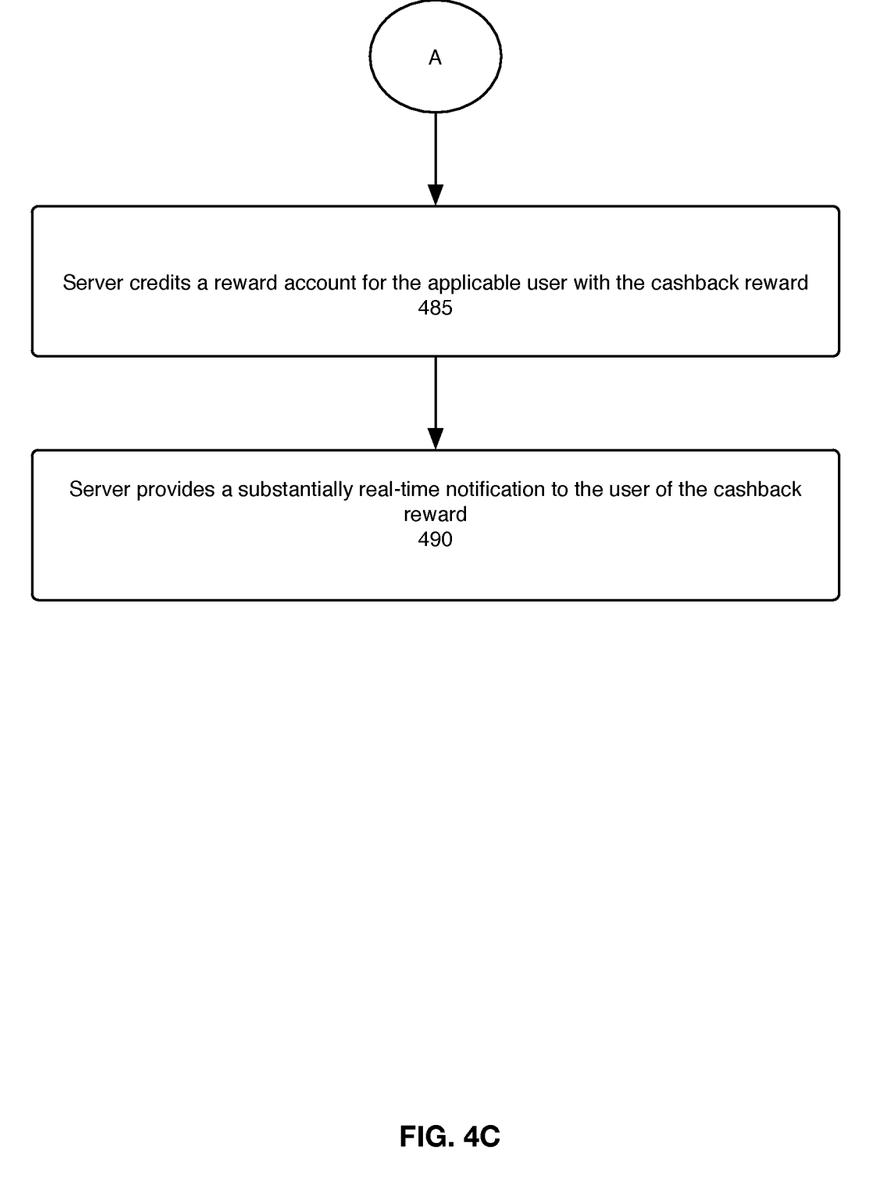

For example purposes, the components/modules of FIG. 1 are referenced in the description of FIGS. 2-4. However, the methods described herein may be implemented in a system configured differently and are not limited to the system architecture illustrated in FIG. 1.

FIGS. 2A-B illustrates a method for providing users with notifications of a cashback rewards from a shopping portal using screen and email analysis. As illustrated in steps 205-220, the method includes parallel processes for capturing order-confirmation emails and order-confirmation screens.

Email Order-Confirmation Capture

An email capture module (e.g., email capture module 195 in FIG. 1) on a server associated with the shopping portal ("the server") analyzes content and characteristics of emails from merchants to determine whether any emails are likely order-confirmation emails (step 205). The email capture module may obtain and assess the emails (e.g., message content and metadata) from an email server by authenticating and securely connecting to the email server.

In one embodiment, to ascertain whether an email is a likely order-confirmation email from an applicable merchant (i.e., a merchant for which a cashback reward may be eligible), the email capture module first determines whether the email was sent by an applicable merchant. As a merchant may use several email addresses, mapping logic may be used to determine whether the email address is associated with an applicable merchant (e.g., the email address is compared to merchant email addresses in a look-up table). In alternate embodiment, machine learning may be used to determine whether the email is from a relevant/applicable merchant.

If the email was sent by an applicable merchant, the email capture module then determines whether the email is an order-confirmation email. In one embodiment, the module determines whether the email includes a minimum number of phrases and/or characteristics associated with a merchant's order-confirmation email. For example, the email capture module may compare the email to merchant order-confirmation email templates. The email capture module may use regular expressions to do such comparison. In another alternate embodiment, machine learning is used to determine if the email is an order-confirmation email.

The email capture module may consider the current date in relation to the email date and/or order date. It may disregard emails or orders that are n many days before the current date.

In response to determining that an email is likely a valid order-confirmation email with a threshold degree of confidence (e.g., 90% confident), the email monitoring module stores the email in a database (e.g., database 140) (step 210) for further processing by the server.

Online Screen Order-Confirmation Capture

A screen capture module within each client application (e.g., screen capture module 120) analyzes content and characteristics of screens rendered within the client application to determine whether any of the screens are likely order-confirmation screens from applicable merchants (step 215). The screen capture module analyzes the screens in substantially real time as the screen is displayed within the client application.

In one embodiment, the screen capture module first determines whether a screen rendered in a client application is from an applicable merchant based on the domain of the screen. If the domain corresponds to an applicable merchant, the screen capture module then compares the content/characteristics of the rendered screen to phrases and/or characteristics associated with the merchant's order-confirmation screen. The characteristics of a screen may include the URL of the screen. The screen capture module may use regular expressions to do the comparison. In an alternate embodiment, machine learning is used to determine if the screen is an order-confirmation screen. In response to concluding with a threshold degree of confidence (e.g., 90% confident) that a screen is likely an order-confirmation screen, the client application sends screen information to the server (step 220), which stores the screen data in database 140 for further processing by the server.

Cashback-Reward Calculation

As used herein, the terms "email capture" and "screen capture" refer to emails and online screens identified in steps 205-220 to be likely order-confirmation emails and order-confirmation screens, respectively, from applicable merchants.

The shopping portal server (e.g., server 130) further parses email captures and screen captures to extract data values, including date and time stamp, order number, and purchase amount (step 225). The extracted data values are stored in association with a user identifier and a merchant identifier corresponding to the email/screen capture. If the server is unable to successfully extract required data values from an email or screen capture, the server disregards the capture for the purpose of calculating a cashback reward. In the system of FIG. 1, parser module 175 performs step 225 and then stores the extracted data values in database 140. In certain embodiments, this parsing could be done by the capture modules.

For each email capture and screen capture, the server determines if the order corresponding to the capture is an order that qualifies for a cashback reward with the shopping portal (step 230). Specifically, for an email capture, the server determines if the order described in the email was likely placed in an online merchant shopping session initiated from the shopping portal. The server separately maintains a record of all online shopping sessions initiated through the shopping portal (e.g., database 185), and, in one embodiment, the server determines if the user used the shopping portal to initiate an online shopping session at the same merchant within a certain window of time prior to either the order date and time set forth in the email (if available) or the date and time of the email transmission. Other factors may also be used in comparing email captures and online shopping sessions, such as comparing promotional codes, payment method, and product descriptions.

In response to finding an online shopping session for the user that corresponds to the email capture (e.g., time, user, and merchant substantially match), the server determines if the order terms are valid (e.g., a valid promotional code). If so, the server concludes that the email capture corresponds to an order that qualifies for a cashback reward with the shopping portal (a "reward-qualifying order").

For a screen capture, the server performs step 230 by determining if one or more extracted data values correspond to valid terms of a reward-qualifying order. For example, the server may determine if there a valid promotional code in the screen capture (e.g., a promo code associated with the shopping portal). Validation may also depend on the type of product purchased, the method of payment, and time of online session. If the applicable data values from the screen capture are valid, the server concludes that the screen capture corresponds to a reward-qualifying order.

In response to determining that the email/screen capture corresponds to a reward-qualifying order, the server determines if a cashback reward has already been credited to the user for the order based on a previous email/screen capture (step 235). For an email capture, the server determines if there is a corresponding screen capture in database 140. Likewise, for a screen capture, the server determines if there is a corresponding email capture in database 140. In either case, the server concludes that there is a corresponding capture if a number of factors match or substantially match across the two captures, such as user, merchant, purchase amount, order number, product name, and date/time. "Fuzzy logic" may be used to perform the matching operations.

If the server finds a corresponding capture, the server determines if a cashback reward was previously credited to the user for the corresponding capture. If so, there is no further cashback reward for the new capture. In certain embodiments, the server may execute rules to determine if the cashback reward should be updated based on information in the new capture.

If the email/screen capture corresponds to a reward-qualifying order and no previous cashback reward has been credited to the user for the order, the server calculates a cashback reward (step 240). In one embodiment, the reward is calculated based on cashback rules for the applicable merchant and the purchase amount extracted from the new email/screen capture. The server credits the user account with the cashback reward, and provide a notification to the user of the reward (steps 245, 250). The notification may be in the form of one or more of the following: a browser notification, a mobile application push notification, an email, a text, or update account information on a website for the shopping portal. In one embodiment, a notification based on a screen capture is sent within seconds or minutes (e.g., 30-120 seconds) of the order confirmation screen being displayed with the client application, and a notification based on email capture is sent within minutes of the email being transmitted (e.g., 2-3 minutes). The notification may include the specific reward amount or may be a general notice that a reward has been earned. The notification may or may not include specific order details, such as the order number, date, merchant name, purchase amount, etc. The notification also may indicate that the reward is pending, as it may be subject to subsequent confirmation based on merchant reports.

In the system illustrated in FIG. 1, reward calculation module 165 performs steps 225-250. Email and screen capture data is stored in database 140, online shopping session records are stored in database 185, and user cashback reward balances are stored in database 180.

FIGS. 3A-C illustrates an example implementation of the above-described reward calculation in response to the server identifying an email as a probable order-confirmation email (i.e., in response to a new email capture). As described above, in response to receiving a new email capture, the server parses the email content and metadata to extract data values, including purchase amount, an order number, an order date and time (if available), an email transmission date and time, and a source merchant (i.e., the merchant that sent the email) (steps 305, 310). The server then determines whether the user had a corresponding online shopping session (using the shopping portal) at the same merchant during a select time period (e.g., 2 hours) prior to either the order being completed (if an order time was extracted from the email) or the email being sent (step 320). The server access online shopping session records to perform this determination (e.g., records in database 185). As stated above, other factors (i.e., other extracted data values) also may be used in determining whether there is a corresponding online session.

In response to step 320 evaluating to true, the server determines if the extracted order terms in the email are valid with respect to earning a reward (step 330). If so, the server concludes that the email corresponds to a reward-qualifying order (step 335). If either step 320 or 330 evaluates to false, the server does not proceed with calculating a cashback reward based on the email (step 340).

In response to determining that the email corresponding to a reward-qualifying order, the server determines whether there is a previously-captured online screen that corresponds to the same order as the email (step 350). If the server finds a corresponding online screen capture, the server determines if a cashback reward was previously credited to the user for the order (step 360). If so, the server does not calculate an additional cashback reward (except that in certain embodiments, the server may execute rules to determine if the email capture results in an update to the cashback reward) (step 370).

If there is no corresponding screen capture or no cashback reward was credited for a corresponding screen capture, the server calculates a cashback reward for the user based on a cashback percentage offered by the applicable merchant and the purchase amount in the email capture (step 380). The server credits a reward account for the user with the cashback reward (step 385), and the server provide a substantially real-time notification to the user of the cashback reward (step 390).

FIGS. 4A-C illustrates an example implementation of the above-described reward calculation in response to the server identifying an online screen as a probable order-confirmation screen (i.e., in response to a new screen capture). As described above, in response to receiving a new screen capture, the server parses the screen content to extract data values, including purchase amount, an order number, a screen capture time and date and/or an order date and time, and a source merchant (steps 405, 410).

The server then determines whether one or more data values extracted from the screen correspond to a valid shopping session with the shopping portal (e.g., does the promotional code correspond to the shopping portal?) (step 420). In response to step 420 evaluation to true, the server concludes that the screen corresponds to a reward-qualifying order (step 430). Otherwise, the server does not proceed with calculating a cashback reward based on the screen capture (step 440).

In response to determining that the screen corresponding to a reward-qualifying order, the server determines whether there is a previously-captured email that corresponds to the same order as the screen capture (step 450). If the server finds a corresponding email capture, the server determines if a cashback reward was previously credited to the user for the order (step 460). If so, the server does not calculate an additional cashback reward (except that in certain embodiments, the server may execute rules to determine if the screen capture results in an update to the cashback reward) (step 470).

If there is no corresponding email capture or no cashback reward was credited for a corresponding screen capture, the server calculates a cashback reward for the user based on a cashback percentage offered by the applicable merchant and the purchase amount in the screen capture (step 480). The server credits a reward account for the user with the cashback reward (step 485), and the server provide a substantially real-time notification to the user of the cashback reward (step 490).

In certain embodiments, the system identifies and parses shipping-notification emails (i.e., an email confirming that a product ordered online has shipped) in the same manner that order-confirmation emails are identified and parsed. Data extracted from shipping-notification emails may be used to notify users of pending or earned rewards in the same manner as described with respect to order-confirmation emails.

The system and methods described herein can be applied to rewards other than cashback rewards and are not necessarily limited to cashback rewards. For example, if the shopping portal enables users to earn merchant credits on purchases, the methods could be used to notify users of merchant credits earned based on email and screen analysis.

In certain embodiments where machine learning is used to determine whether an email or screen is an order-confirmation email/screen, the system creates a statistical model (e.g., a Bayesian model) that maps screen/email characteristics and content elements to a probability of being an order-confirmation screen/email. The model may be trained with training data that includes screens and emails labeled as to whether they are order-confirmation screens/emails. To subsequently use the model, the system creates an input vector from multiple characteristics/content extracted from a screen/email, and applies the input vector to the statistical model to obtain a probability that the email/screen is an order-confirmation page. In response to the probability exceeding a threshold (e.g., 0.9), the system concludes the webpage is an order-confirmation screen/email.

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for providing a user with a notification of a cashback reward using screen and email content analysis, wherein the cashback reward is based on a purchase originating from a shopping portal that offers cashback rewards, the method comprising:
   maintaining a record of online shopping sessions in which the user used the shopping portal, including recording a merchant and time associated with each online shopping session;
   analyzing content and characteristics of emails received by the user from merchants to determine whether any emails are probable order-confirmation emails;
   analyzing content and characteristics of online screens rendered to the user via one or more client applications to determine, in substantially real time, whether any of the screens are probable order-confirmation screens;
   identifying a screen rendered to the user as a probable order-confirmation screen;
   parsing the screen content to extract a plurality of data values;
   determining if the screen corresponds to a qualifying order for a cashback reward by determining whether data values extracted from the screen content correspond to a valid session at the shopping portal;
   in response to determining that the screen corresponds to a qualifying order, determining if a cashback reward has already been credited to the user for the order, wherein such determination comprises:

determining if the system captured an email that corresponds to a same order as the screen; and
in response to identifying an email captured by the system for the same order, determining if a cashback reward was previously provided to the user based on the email;
in response to determining that the system has not previously provided a cashback reward to the user for the order, calculating a cashback reward;
crediting a reward account for the user with the cashback reward; and
providing a substantially real time notification to the user of the cashback reward.

2. The method of claim 1, further comprising:
identifying an email as a probable order-confirmation email;
parsing the email content and metadata to extract a plurality of data values, including a purchase amount, an order number, an order date and time if available, and a source merchant;
determining if the email corresponds to a qualifying order for a cashback reward by determining whether the user used the shopping portal in an online session for the source merchant during a select time window prior to the order date and time or the email being sent;
in response to determining that an email corresponds to a qualifying order, determining if a cashback reward has already been credited to the user for the order, wherein such determination comprises:
determining if the system captured an online screen that corresponds to a same order as the email; and
in response to identifying an online screen captured by the system for the same order, determining if a cashback reward was previously credited to the user based on the online screen;
in response to determining that the system has not previously provided a cashback reward to the user for the order, calculating a cashback reward;
crediting a reward account for the user with the cashback reward; and
providing a substantially real time notification to the user of the cashback reward.

3. The method of claim 2, wherein determining if the email corresponds to a qualifying order for a cashback reward includes determining whether the email was transmitted by a merchant from which a cashback reward can be earned.

4. The method of claim 1, wherein an email is identified as a probable order-confirmation email in response to the email including a minimum number of same phrases and/or characteristics as an order-confirmation email from the merchant.

5. The method of claim 1, wherein a screen is identified as a probable order-confirmation screen in response to the screen including a minimum number of same phrases and/or characteristics as an order-confirmation screen for the merchant.

6. The method of claim 1, wherein a screen is identified as a probable order-confirmation screen in response to the screen content satisfying a regular expression of an order-confirmation screen for the merchant.

7. The method of claim 1, wherein the notification is sent using one or more of the following: browser notification, mobile application push notification, device push notification, user account update on a website, or email.

8. A computer system for providing a user with a notification of a cashback reward using screen and email content analysis, wherein the cashback reward is based on a purchase originating from a shopping portal that offers cashback rewards, the system comprising:
one or more processors;
one or more memory units coupled to the one or more processors, wherein the one or more memory units store instructions that, when executed by the one or more processors, cause the system to perform operations of:
maintaining a record of online shopping sessions in which the user used the shopping portal, including recording a merchant and time associated with each online shopping session;
analyzing content and characteristics of emails received by the user from merchants to determine whether any emails are probable order-confirmation emails;
analyzing content and characteristics of online screens rendered to the user via one or more client applications to determine, in substantially real time, whether any of the screens are probable order-confirmation screens;
identifying a screen rendered to the user as a probable order-confirmation screen;
parsing the screen content to extract a plurality of data values;
determining if the screen corresponds to a qualifying order for a cashback reward by determining whether data values extracted from the screen content correspond to a valid session at the shopping portal;
in response to determining that the screen corresponds to a qualifying order, determining if a cashback reward has already been credited to the user for the order, wherein such determination comprises:
determining if the system captured an email that corresponds to a same order as the screen; and
in response to identifying an email captured by the system for the same order, determining if a cashback reward was previously provided to the user based on the email;
in response to determining that the system has not previously provided a cashback reward to the user for the order, calculating a cashback reward;
crediting a reward account for the user with the cashback reward; and
providing a substantially real time notification to the user of the cashback reward.

9. The system of claim 8, further comprising:
identifying an email as a probable order-confirmation email;
parsing the email content and metadata to extract a plurality of data values, including a purchase amount, an order number, an order date and time if available, and a source merchant;
determining if the email corresponds to a qualifying order for a cashback reward by determining whether the user used the shopping portal in an online session for the source merchant during a select time window prior to the order date and time or the email being sent;
in response to determining that an email corresponds to a qualifying order, determining if a cashback reward has already been credited to the user for the order, wherein such determination comprises:
determining if the system captured an online screen that corresponds to a same order as the email; and
in response to identifying an online screen captured by the system for the same order, determining if a cashback reward was previously credited to the user based on the online screen;

in response to determining that the system has not previously provided a cashback reward to the user for the order, calculating a cashback reward;

crediting a reward account for the user with the cashback reward; and providing a substantially real time notification to the user of the cashback reward.

10. The system of claim 9, wherein determining if the email corresponds to a qualifying order for a cashback reward includes determining whether the email was transmitted by a merchant from which a cashback reward can be earned.

11. The system of claim 8, wherein an email is identified as a probable order-confirmation email in response to the email including a minimum number of same phrases and/or characteristics as an order-confirmation email from the merchant.

12. The system of claim 8, wherein a screen is identified as a probable order-confirmation screen in response to the screen including a minimum number of same phrases and/or characteristics as an order-confirmation screen for the merchant.

13. The system of claim 8, wherein a screen is identified as a probable order-confirmation screen in response to the screen content satisfying a regular expression of an order-confirmation screen for the merchant.

14. The system of claim 8, wherein the notification is sent using one or more of the following: browser notification, mobile application push notification, device push notification, user account update on a website, or email.

15. A non-transitory computer-readable medium comprising a computer program that, when executed by a computer system, enables the computer system to perform a method for providing a user with a notification of a cashback reward using screen and email content analysis, wherein the cashback reward is based on a purchase originating from a shopping portal that offers cashback rewards, the method comprising:

maintaining a record of online shopping sessions in which the user used the shopping portal, including recording a merchant and time associated with each online shopping session;

analyzing content and characteristics of emails received by the user from merchants to determine whether any emails are probable order-confirmation emails;

analyzing content and characteristics of online screens rendered to the user via one or more client applications to determine, in substantially real time, whether any of the screens are probable order-confirmation screens;

identifying a screen rendered to the user as a probable order-confirmation screen;

parsing the screen content to extract a plurality of data values;

determining if the screen corresponds to a qualifying order for a cashback reward by determining whether data values extracted from the screen content correspond to a valid session at the shopping portal;

in response to determining that the screen corresponds to a qualifying order, determining if a cashback reward has already been credited to the user for the order, wherein such determination comprises:

determining if the system captured an email that corresponds to a same order as the screen; and in response to identifying an email captured by the system for the same order, determining if a cashback reward was previously provided to the user based on the email;

in response to determining that the system has not previously provided a cashback reward to the user for the order, calculating a cashback reward;

crediting a reward account for the user with the cashback reward; and providing a substantially real time notification to the user of the cashback reward.

16. The non-transitory computer-readable medium of claim 15, further comprising:

identifying an email as a probable order-confirmation email;

parsing the email content and metadata to extract a plurality of data values, including a purchase amount, an order number, an order date and time if available, and a source merchant;

determining if the email corresponds to a qualifying order for a cashback reward by determining whether the user used the shopping portal in an online session for the source merchant during a select time window prior to the order date and time or the email being sent;

in response to determining that an email corresponds to a qualifying order, determining if a cashback reward has already been credited to the user for the order, wherein such determination comprises:

determining if the system captured an online screen that corresponds to a same order as the email; and in response to identifying an online screen captured by the system for the same order, determining if a cashback reward was previously credited to the user based on the online screen;

in response to determining that the system has not previously provided a cashback reward to the user for the order, calculating a cashback reward;

crediting a reward account for the user with the cashback reward; and providing a substantially real time notification to the user of the cashback reward.

17. The non-transitory computer-readable medium of claim 16, wherein determining if the email corresponds to a qualifying order for a cashback reward includes determining whether the email was transmitted by a merchant from which a cashback reward can be earned.

18. The non-transitory computer-readable medium of claim 15, wherein an email is identified as a probable order-confirmation email in response to the email including a minimum number of same phrases and/or characteristics as an order-confirmation email from the merchant.

19. The non-transitory computer-readable medium of claim 15, wherein a screen is identified as a probable order-confirmation screen in response to the screen including a minimum number of same phrases and/or characteristics as an order-confirmation screen for the merchant.

20. The non-transitory computer-readable medium of claim 15, wherein a screen is identified as a probable order-confirmation screen in response to the screen content satisfying a regular expression of an order-confirmation screen for the merchant.

21. The non-transitory computer-readable medium of claim 15, wherein the notification is sent using one or more of the following: browser notification, mobile application push notification, device push notification, user account update on a web site, or email.

* * * * *